(12) United States Patent
Kambhampati et al.

(10) Patent No.: US 7,974,279 B2
(45) Date of Patent: Jul. 5, 2011

(54) MULTIPATH DATA COMMUNICATION

(75) Inventors: Vamsi Krishna Kambhampati, Fort Collins, CO (US); Lars Rene Eggert, Helsinki (FI)

(73) Assignee: Nokia Corporation, Espoo (FI)

( * ) Notice: Subject to any disclaimer, the term of this patent is extended or adjusted under 35 U.S.C. 154(b) by 216 days.

(21) Appl. No.: 12/322,140

(22) Filed: Jan. 29, 2009

(65) Prior Publication Data

US 2010/0189110 A1    Jul. 29, 2010

(51) Int. Cl.
*H04L 12/28* (2006.01)
(52) U.S. Cl. ........................... 370/389; 370/400
(58) Field of Classification Search .................. None
See application file for complete search history.

(56) References Cited

U.S. PATENT DOCUMENTS

| | | | |
|---|---|---|---|
| 2007/0201427 A1* | 8/2007 | Lee et al. | 370/351 |
| 2010/0189110 A1* | 7/2010 | Kambhampati et al. | 370/400 |

FOREIGN PATENT DOCUMENTS

WO    WO-2007/035655 A1    3/2007

OTHER PUBLICATIONS

"TVA: A Dos-Limiting Network Architecture" Xiaowei Yang et al. IEEE/ACM Transactions on Networking. vol. 16, No. 6. Dec. 2008. (pp. 1267-1280).
"Source Route Capabilities". Vamsi Kambhampati et al. Dept. of Computer Science, Colorado State University.Aug. 24-28, 2009. http://streaming.info.ucl.ac.be/data/grascomp/poster/trilogy-paper27.pdf (2 pages).
"Network Capabilities: The Good, the Bad and the Ugly". Katerina Argyraki, David R. Cheriton.Distributed Systems Group, Stanford University. Nov. 2005. (5 pages).
"A DoS-limiting Network Architecture", Xiaowei Yang et al., ACM SIGCOMM, Aug. 2005, pp. 241-252.
"Controlling High Bandwidth Aggregates in the Network", Ratul Mahajan et al., ACM SIGCOMM Computer Communications Review, vol. 32, No. 3, Jul. 2002, pp. 62-73.
"Chord" A Scalable Peer-to-peer Lookup Service for Internet Applications, Ion Stoica et al., ACM SIGCOMM, Aug. 2001, pp. 149-160.

(Continued)

*Primary Examiner* — Robert W Wilson
(74) *Attorney, Agent, or Firm* — Harrington & Smith

(57) ABSTRACT

A multipath data communication network structure in which probing middle-boxes send periodical probe messages through their different interfaces and subsequent routers map the probe messages through their randomly selected interfaces until each probe message arrives at a destination, engages to a loop or meets a time-to-live limit. The probing middle boxes select a random interface for each probe message and furnish their routable identification and a temporary random number correlated to the selected interface to each probe messages. Subsequent multipath routers select a random outgoing interface and random forwarding state descriptor (FSD) and temporarily correlate the selected random outgoing interface with the FSD and add the FSD to the probe message. The probe messages provide different destinations with various hidden paths. Each hidden path enables forwarding of packets from probing middle-boxes to the destination without identifying any routable address en-route to the destination. The destination then provides a data source with the hidden path. Each multipath network element only store their mappings related to the paths for limited term so that each path expires and vanishes after the term. Attackers are not issued a new path and thus denial of service attacks are shortly stopped.

42 Claims, 4 Drawing Sheets

OTHER PUBLICATIONS

"Portcullis: Protecting Connection Setup from Denial-of-Capability Attacks", Bryan Parno, et al., ACM SIGCOMM, Aug. 2007, 12 pgs.
"SIFF: A Stateless Internet Flow Filter to Mitigate DDoS Flooding Attacks", Abraham Yaar et al., IEEE 2004, pp. 1-14.
"Active Internet Traffic filtering: Real-Time Response to Denial-of-Service Attacks", Katerina Argraki, et al., Distributed Systems Group, Stanford University, 14 pgs. dated 2005.

* cited by examiner

MULTIPATH DATA COMMUNICATION

FIELD OF THE INVENTION

The present invention generally relates to multipath data communication. The invention relates particularly, though not exclusively, to controlling access to a multipath destination by the multipath destination itself.

BACKGROUND OF THE INVENTION

Internet has brought a variety of information and services easily accessible to masses of users. Along with traditional packet switched networks which constitute the Internet, customer networks (also known as stub-ASs) are increasingly considering site multi-homing for redundancy, load balancing and operational policies/costs. In particular, Internet businesses such as e-trade, e-commerce, content providers, and web hosting services greatly benefit from multi-homing due to its load balancing and redundancy properties. Moreover, servers equipped with multiple network interfaces can connect independently to each of the multi-homed links, to improve availability. Failure of a few access links in this case does not severely affect the availability of the server. These advantages are not limited to large businesses. In fact, home offices and home-based businesses also have a need for high availability. One way to achieve this for a home business owner is to buy network access from multiple Internet providers (for example, different cable providers, DSL, satellite, etc), and equip the server with multiple network interfaces. Mobile devices such as laptops and PDAs are already equipped with multiple (wired and) wireless interfaces. The home business market can easily extend to these mobile environments, leveraging on the multiple access options provided by the devices. These factors are influencing the network operators (ISPs) to consider multipath options for the Internet.

Although multipath networks may improve availability, they do not, however, guarantee uninterrupted operation under deliberate network attacks. For example, a large-scale Distributed Denial of Service attacks (DDoS) attack may bring down an entire site, regardless of its connectivity.

A DDoS attack is a computer security problem in which a malicious entity i.e. an attacker uses several networked hosts distributed across the Internet to send large volume of unwanted traffic to consume all the available network resources (such as bandwidth) at or near a server. Due to the large volume of traffic from the attacker, a legitimate client may not be able to reach the server, causing a denial of service to the legitimate client.

DDoS attacks are the network equivalent of Denial-of-Service (DoS) attacks in which the attacker disrupts the services provided by a system, typically, by exploiting known software vulnerabilities or protocol weaknesses. However, unlike DoS attacks, which can be mitigated by improving the software on a system, DDoS attacks are challenging to mitigate. Namely, in the Internet, any source can freely send traffic to any destination and thus a targeted destination can be flooded with data or requests.

DDoS attacks severely affect the availability of a server, which in turn impacts the services offered by that server. For example, an e-banking site under a heavy DDoS attack can no longer serve its customers, resulting in monetary losses and permanent damage to its reputation.

One technique for enhancing the resilience of the Internet against malicious attacks is based on filtering. In filtering, the traffic responsible for the attack is monitored and filtered by routers upstream of the destination. The idea is to identify attack traffic at routers (typically the traffic causing severe congestion) and request upstream routers to start dropping or rate limiting this traffic. However, filtering has several shortcomings. First, the number of false positives is high, because routers make imprecise decisions on what traffic is good or bad. Often, the routers simply lack sufficient knowledge to conclude what part of data traffic to filter out. Second, to prevent trivial attacks using filtering requests, the node making the decisions needs to authenticate itself to the node responsible for filtering. During large-scale attacks, the number of filtering routers could be in the order of thousands, which leads to scalability issues for the authentication component of the system. Finally, installing filters requires cooperation among different Internet Service Providers (ISP), which is often difficult in the Internet, because these ISPs may not have a direct contractual or business relationship.

Another, more recent technique against DDoS attacks is based on network capabilities. The network capability technique advocates fundamental changes to the Internet. Senders or generally data sources must obtain explicit authorization by means of a cryptographic capability token from a receiver before they are allowed to send any significant amount of traffic to the destination. Basically, a sender willing to communicate to a destination sends an initial "request" packet to the receiver. Routers on the forwarding path insert cryptographic tokens called "pre-capabilities" into the requests. Upon receiving the request, the receiver synthesizes a cryptographic token called "host-capability" from pre-capabilities and returns it to the sender. Capabilities use cryptographic techniques so that routers can verify their validity and reject invalid tokens. Subsequent data packets from the sender must carry capabilities; otherwise, routers will drop the packets as unauthorized. Hence, the receiver can reject senders simply by not returning capabilities responsive to their requests. Moreover, the senders' IP addresses need to be valid, otherwise fake IP address in the request packet results in that no capability will ever be received by the sender and thus larger scale communication to the destination from one source may be inhibited. However, the generation of various cryptographic tokens and verifying them results in relatively high complexity and resource consumption.

In the Internet, each data packet between a source and destination may be routed through different nodes thus over differing paths. A multipath network makes use of numerous communication interfaces at the source and destination. Hence, packets of one data stream (e.g. file download) are sent over two or more different communication interfaces and received at the destination over various communication interfaces. Corresponding distribution of packets onto different streams and responsive multiplexing of packets again into a single data stream is dealt with by corresponding layers at protocol stacks of the source and destination. The aforementioned network capability based techniques are not well suited for use in multipath networks and it appears that their adaptation to multipath networks would result in even greater complexity.

SUMMARY

According to a first exemplary aspect of the invention there is provided a method comprising:

storing path information that describes an arbitrary path between an intermediate multipath communication network node and a multipath communication network destination node; wherein the intermediate multipath communication network node is referred to as an access node; the path information further comprising an access node identification based on which data packets are routable to the access node;

containing in the path information an indication of a destination interface though which the destination node is accessible;

providing a data source with the path information; and receiving data from the data source via the destination interface and the arbitrary path defined by the path information.

The destination interface may not be commonly routable. The destination interface may be accessible only via a commonly routable multipath network node.

The access node may be a commonly routable multipath network node.

The method may further comprise revoking the arbitrary path by the destination. The revoking may comprise associating with the path information a timer configured to temporally limit the validity of the path information. Alternatively, or additionally, the revoking may comprise sending a revocation command to at least one node along the arbitrary path.

The method may further comprise receiving a probe message originating from the access node via a series of further intermediate multipath nodes and obtaining the path information from the probe message.

The method may further comprise informing the data source of the arbitrary path indirectly through at least one particular intermediate multipath network node referred to as a path provisioning node. The indirect informing may comprise using a distributed hash table.

The method may further comprise informing the path provisioning node of data sources to which the path information should not be provided.

The method may further comprise scheduling different arbitrary paths for simultaneous use such that common communication network nodes on two simultaneously usable paths are avoided.

According to a second exemplary aspect of the invention there is provided a method comprising:

obtaining path information that describes an arbitrary path between an intermediate multipath communication network node and a multipath communication network destination node; wherein the intermediate multipath communication network node is referred to as an access node; the path information further comprising an access node identification based on which data packets are routable to the access node;

combining the path information with a data packet to be sent to the destination node; and transmitting the data packet to the destination node at an interface of the destination node identified by the path information through the access node and the arbitrary path defined by the path information.

The method of the second exemplary aspect may further comprise contacting a commonly routable interface of the destination node by a request message and responsively receiving the path information.

Alternatively, the method of the second exemplary aspect may further comprise indirectly obtaining the path information from the destination node through at least one particular intermediate multipath network node referred to as a path provisioning node. The indirect informing may comprise using a distributed hash table.

According to a third exemplary aspect of the invention there is provided a method comprising:

causing production of path information that describes an arbitrary path between an intermediate multipath communication network node and a multipath communication network destination node; wherein the intermediate multipath communication network node is referred to as an access node; the path information further comprising an access node identification based on which data packets are routable to the access node;

the causing of the production of the path information comprising:

periodically producing probe messages comprising an identifier of the access node and a random number; and sending each of the probe messages through a random interface of the access node;

the method further comprising storing an association between the random number and the random interface for each of the probe messages.

The method may further comprise associating a timer with each of the probe messages; and deleting the association between the random number and the random interface after the associated timer meets a predetermined threshold.

According to a fourth exemplary aspect of the invention there is provided a method comprising:

receiving a probe packet from comprising an identifier indicative of the origin of the probe packet and comprising identification of one or more intervening multipath routers based on their interfaces;

selecting a random interface;

generating a random number within a predetermined number space;

correlating the random number with the random interface and storing the correlation; and adding the random number to the probe packet and forwarding the probe packet through the selected random interface.

The method may further comprise setting a period of validity for the correlation and deleting the correlation after the period of validity.

The method may further comprise storing a router identifier and verifying whether the probe packet already contains the router identifier and if yes, abstaining from forwarding the probe packet.

The method may further comprise, in case that the probe packet does not contain the router identifier, adding the router identifier to the probe packet before or on forwarding the probe packet through the selected random interface.

According to a fifth exemplary aspect of the invention there is provided a method comprising any combination of the methods according to the first, second, third and fourth exemplary aspect.

According to a sixth exemplary aspect of the invention there is provided an apparatus comprising:

a memory configured to store path information that describes an arbitrary path an intermediate multipath communication network node and the apparatus; wherein the intermediate multipath communication network node is referred to as an access node; the path information further comprising an access node identification based on which data packets are routable to the access node;

a processor configured to contain in the path information an indication of a destination interface though which the apparatus is accessible;

an output configured to provide a data source with the path information; and an input configured to receive data from the data source via the destination interface and the arbitrary path defined by the path information.

The processor may further be configured to enable revoking of the arbitrary path. The processor may further be configured to cause the revoking by associating with the path information a timer configured to temporally limit the validity of the path information. Alternatively, or additionally, the processor may be configured to send a revocation command to at least one node along the arbitrary path.

The probe message may be received from the access node via a series of further intermediate multipath nodes and the apparatus may be further configured to obtain the path information from the probe message.

The output may be configured to inform the data source of the arbitrary path indirectly through at least one particular intermediate multipath network node referred to as a path provisioning node.

The output may be configured to inform the data source of the arbitrary path indirectly using a distributed hash table through at least one particular intermediate multipath network node referred to as a path provisioning node.

The processor may be further configured to schedule different arbitrary paths for simultaneous use such that common communication network nodes on two simultaneously usable paths are avoided.

According to a seventh exemplary aspect of the invention there is provided an apparatus comprising a processor configured:
to obtain path information that describes an arbitrary path between an intermediate multipath communication network node and a multipath communication network destination node; wherein the intermediate multipath communication network node is referred to as an access node; the path information further comprising an access node identification based on which data packets are routable to the access node;
to combine the path information with a data packet to be sent to the destination node; and
to transmit the data packet to the destination node at an interface of the destination node identified by the path information through the access node and the arbitrary path defined by the path information.

The apparatus may further be configured to contact a commonly routable interface of the destination node by a request message and to responsively receive the path information.

Alternatively, the apparatus may further be configured to indirectly obtain the path information from the destination node through at least one particular intermediate multipath network node referred to as a path provisioning node.

The apparatus may be configured to indirectly obtain the path information from the destination node through at least one particular intermediate multipath network node referred to as a path provisioning node using a distributed hash table.

According to an eighth exemplary aspect of the invention there is provided an apparatus comprising:
a plurality of communication interfaces;
a processor configured to cause production of path information that describes an arbitrary path between the apparatus and a multipath communication network destination node; the path information further comprising an access node identification based on which data packets are routable to the apparatus;
the processor being configured to cause the production of the path information by:
periodically producing probe messages comprising an identifier of the apparatus and a random number; and
sending each of the probe messages through a random one of the interfaces;
a memory configured to store an association between the random number and the random interface for each of the probe messages.

The processor may further be configured to associate a timer with each of the probe messages and to delete the association between the random number and the random interface after the associated timer meets a predetermined threshold.

According to a ninth exemplary aspect of the invention there is provided an apparatus comprising:
an input configured to receive a probe packet from comprising an identifier indicative of the origin of the probe packet and comprising identification of one or more intervening multipath routers based on their interfaces;
a processor configured to perform operations of:
selecting a random interface;
generating a random number within a predetermined number space;
correlating the random number with the random interface and storing the correlation; and
adding the random number to the probe packet and forwarding the probe packet through the selected random interface.

The processor may further be configured to set a period of validity for the correlation and to delete the correlation after the period of validity.

The apparatus may further comprise a memory configured to store a router identifier and the processor may be further configured to verify whether the probe packet already contains the router identifier and if yes, to cause the apparatus to abstain from forwarding the probe packet.

The processor may be further configured to, in case that the probe packet does not contain the router identifier, add the router identifier to the probe packet before or on forwarding the probe packet through the selected random interface.

According to a tenth exemplary aspect of the invention there is provided a system comprising any combination of the apparatuses according to the sixth, seventh, eighth and ninth exemplary aspect.

According to an eleventh exemplary aspect of the invention there is provided a computer program comprising computer executable program code which when executed by a processor enables the processor to:
store path information that describes an arbitrary path an intermediate multipath communication network node and the apparatus; wherein the intermediate multipath communication network node is referred to as an access node; the path information further comprising an access node identification based on which data packets are routable to the access node;
contain in the path information an indication of a destination interface though which the apparatus is accessible;
provide a data source with the path information; and
receive data from the data source via the destination interface and the arbitrary path defined by the path information.

According to a twelfth exemplary aspect of the invention there is provided a computer program comprising computer executable program code which when executed by a processor enables the processor to:
obtain path information that describes an arbitrary path between an intermediate multipath communication network node and a multipath communication network destination node; wherein the intermediate multipath communication network node is referred to as an access node; the path information further comprising an access node identification based on which data packets are routable to the access node;

combine the path information with a data packet to be sent to the destination node; and transmit the data packet to the destination node at an interface of the destination node identified by the path information through the access node and the arbitrary path defined by the path information.

According to a thirteenth exemplary aspect of the invention there is provided a computer program comprising computer executable program code which when executed by a processor enables the processor to:

cause production of path information that describes an arbitrary path between the apparatus and a multipath communication network destination node; the path information further comprising an access node identification based on which data packets are routable to the apparatus;

cause the production of the path information by:
periodically producing probe messages comprising an identifier of the apparatus and a random number; and
sending each of the probe messages through a random interface of the apparatus; and store an association between the random number and the random interface for each of the probe messages.

According to a fourteenth exemplary aspect of the invention there is provided a memory medium comprising a computer program according to any one of the preceding exemplary tenth, eleventh, twelfth and thirteenth aspects.

The memory medium may comprise a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

According to a fifteenth exemplary aspect of the invention there is provided an apparatus comprising:

means for storing path information that describes an arbitrary path an intermediate multipath communication network node and the apparatus; wherein the intermediate multipath communication network node is referred to as an access node; the path information further comprising an access node identification based on which data packets are routable to the access node;

means for containing in the path information an indication of a destination interface though which the apparatus is accessible;

means for providing a data source with the path information; and means for receiving data from the data source via the destination interface and the arbitrary path defined by the path information.

Various embodiments of the present invention have been illustrated only with reference to certain non-binding and exemplary aspects of the invention. It should be appreciated that different embodiments may also be combined with other aspects or embodiments as well.

BRIEF DESCRIPTION OF THE DRAWINGS

The invention will be described, by way of example only, with reference to the accompanying drawings, in which:

FIG. 6 shows an illustration of a structure of a probe message according to an embodiment of the invention;

FIG. 7 shows an illustration of a structure of a data packet carrying user data (payload) from a source to the destination according to an embodiment of the invention.

DETAILED DESCRIPTION

In the following description, like numbers denote like elements.

The inventors have realized, that while at least sometimes a destination of data packets may be able to distinguish between desired and undesired data packets, the Internet does not allow the destination to enforce this desire in the network—or, in other words, stop the unwanted traffic from reaching the destination. The Internet is designed to provide a simple and efficient data transit service, without regard to user desire. Therefore, it is desired to find effective defenses against present security problems of the Internet in order to nurture Internet businesses and foster further growth. In this description, there is disclosure of some embodiments of the invention which seek to tackle with Distributed Denial of Service (DDoS) particularly in multipath networks.

Figure 1:
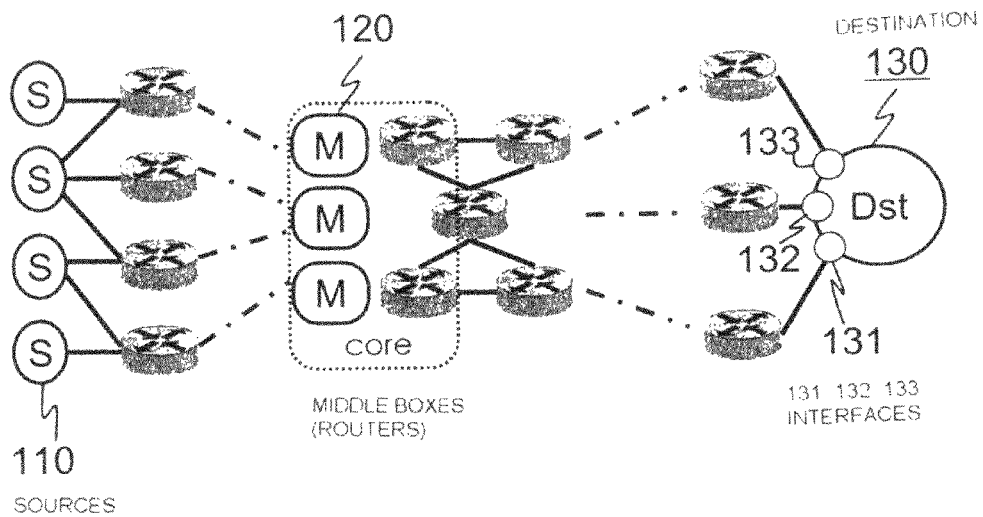
FIG. 1 shows a schematic drawing illustrating various architectural components related to an embodiment of the invention.

FIG. 1 shows a schematic drawing of a system 100 illustrating various architectural components related to an embodiment of the invention. The system 100 comprises a destination 130 that is multipathed without globally reachable addresses. A source 110 is also multipathed without globally reachable addresses. More specifically, an address at an end host is a unique identifier that has no meaning in terms of routing (i.e., non reachable address). The system further comprises a network that has a set of middle-boxes 120. The middle-boxes may be routers. These middle-boxes are routed i.e. have reachable addresses and hence can be reached by any node in the network. One of the middle-boxes denoted as M (reference sign 121 in FIG. 2) is assumed to become a starting point of a hidden path to the destination. The middle-boxes may be configured to periodically send probe messages 140 (FIG. 2) on all their outgoing interfaces.

Determining Hidden Paths

Figure 2:
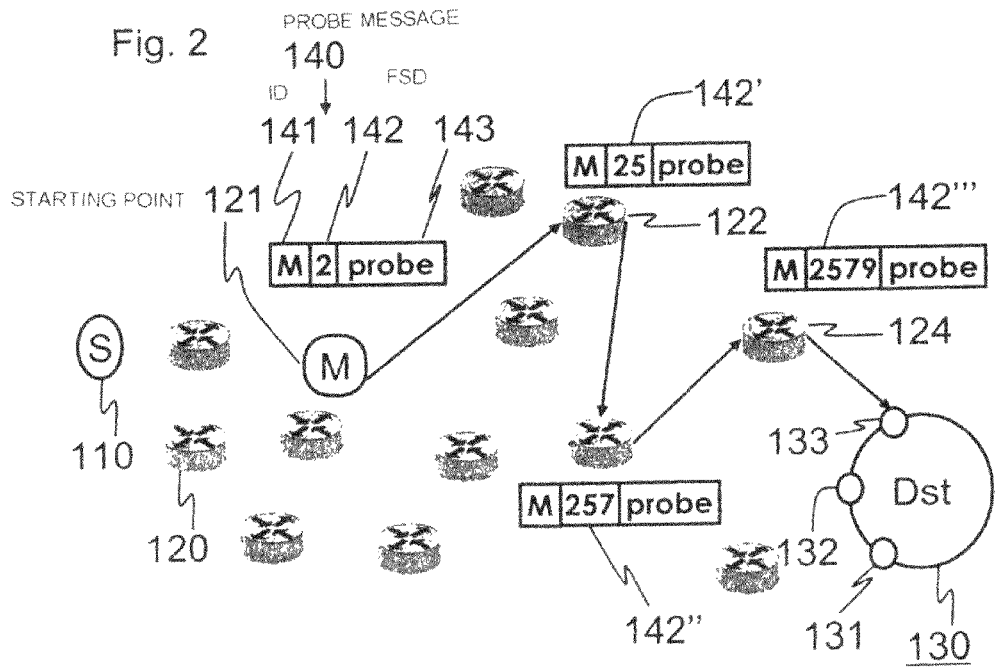
FIG. 2 shows a schematic drawing for illustrating an example of how hidden-paths may be generated and how the source may communicate with the destination.

Referring to FIG. 2, a middle-box sending a probe message 140 is here referred to as a probing entity. Each probe message 140 contains the identity 141 of the probing entity (M in this example) at least one random number that is a forwarding state descriptor (FSD) 142 assigned by the probing entity and by the routers on the path between the probing entity and the destination. The probe message 140 further contains an identifier 143 that identifies the type of the probe message 140. The FSD 142 is correlated by the probing entity and the routers 121 to a randomly selected outgoing interface, typically excluding the interface on which the probe message arrived. The FSD 142 is selected from a number space that is large enough to practically conceal the resulting path and to result in sufficiently large an index base, while not excessive in terms of burdening the data communications network. Here, the FSD 142 may be assumed to use 16 bits i.e., a large field GF(p) which results in 65536 different alternatives. To perform the correlating, the probing entity (or a router) creates an entry in a forwarding table (in the internal memory of the probing entity), indexed by the FSD 142, with the randomly selected interface ID as the value. It is appreciated that each FSD 142 should be unique at any given time, hence the required number space for the FSD 142 may also depend on the interval and the frequency on which the probing entity is sending the probe messages. The probing entity 121 and routers may also associate a timer t_r with the forwarding entry. The probing entity 121 and the routers may then mark the probe packet with the FSD 142 and send the probe message on the interface selected to the node that is connected to the selected interface.

The interval for sending these probe messages may be, for instance, 0.5 to 5 seconds, typically 1 to 2 or 3 seconds. The routers are configured to modify incoming probe messages and to forward them in a random or pseudo-random manner that will be next described.

An example on the composition of the probe message is further described with reference to FIG. 6.

Upon receiving a probe message, the following router (ref. 122 after the probing entity 121) may apply the following process that largely corresponds to that of the probing entity M:

1) Randomly picks an interface from its outgoing interfaces (typically excluding the interface on which the probe message arrived to avoid unnecessary hops).
2) Selects a random forwarding state descriptor (FSD 142)
3) Creates an entry in the forwarding table (internal memory of the middle-box), indexed by the FSD 142, with interface ID as the value.
4) Associates a timer t_r with the forwarding entry.
5) Marks the probe packet with the FSD 142; and
6) Forwards the probe message on the interface selected.

Eventually, with some probability p, a probe message reaches the destination (let us ignore the possibility of loops for the moment). For each probe message received the destination has a list of FSDs 142, denoting the downstream path to the destination, and the routers have the necessary state to do forwarding. This path is here referred to as a hidden or concealed path. Since the interfaces are selected at random, different probe messages traverse different paths in the network resulting in multiple path choices at the destination. FIG. 2 shows the probe message as it leaves different routers (through the path that is thus formed from the probing entity 121 up to the destination 130).

Figure 3:
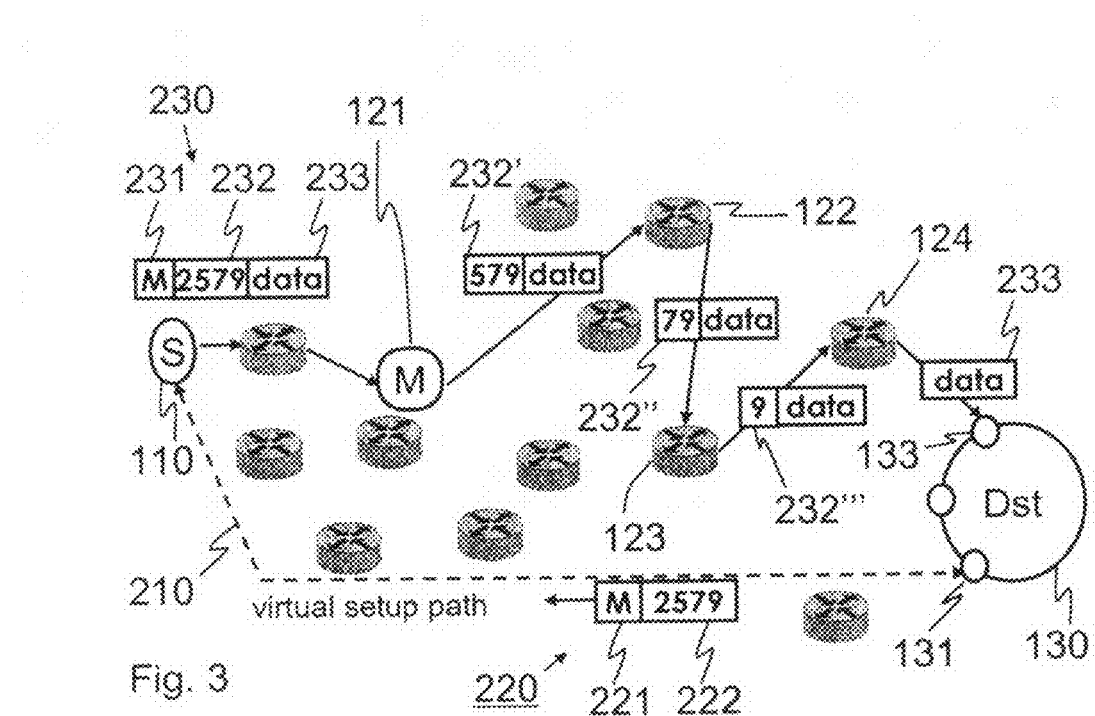
FIG. 3 shows a schematic drawing according to an embodiment of the invention illustrating setting up of a path to the destination of FIG. 1 from a source and traveling of a data packet from the source to the destination.

FIG. 2 shows a schematic drawing for illustrating an example of how hidden-paths may be generated and, FIG. 3 shows how the source may communicate with the destination. The example in FIG. 3 makes use of one or more routable network interfaces which may be used for setting up a hidden path for subsequent use. In the example referred in FIG. 2, a middle-box M generates a probe message, inserts its own address M in the probe message or probe in short, creates an FSD 142 of {2} (see FIG. 1), establishes the forwarding state and adds {2} to the probe packet. The next router 122 on the path to destination creates an FSD of {5}, establishes the forwarding state and adds {5} to the probe packet. As the probe packet reaches the destination, it collects FSDs 142 {2579} from different routers. The list of FSDs 142 combined with the address M becomes the new path to reach the destination.

Setup Mechanism

The hidden path enables relatively safe communication from the source to the destination, but the source has to be informed of the hidden path. To this end, two different mechanisms will next be described. Common to both, the destination is initially aware of at least one hidden path (unknown to everyone else) between a given middle-box and the destination itself.

A source 110 that desires to communicate with the destination may send a path request using the setup channel to the destination 130. Assuming the destination 130 decides to authorize the source, the destination 130 returns the path {M, 2579} to the source (refer to FIG. 3). The source sends subsequent data by attaching this information (in the header field) in the packets. Data packets from the source 110 may first arrive at the middle-box M (note that M is globally reachable and may be preceded by one or more multipath or single path routers) and are forwarded hop-by-hop through subsequent routers. Each router may look up the corresponding interface ID in the forwarding table, strip off its own FSD 142, and forward the packet to the next router. The destination may be surrounded by multi-homed border routers each connected to a different network interface. Finally, the data packet reaches the destination.

Figure 4:
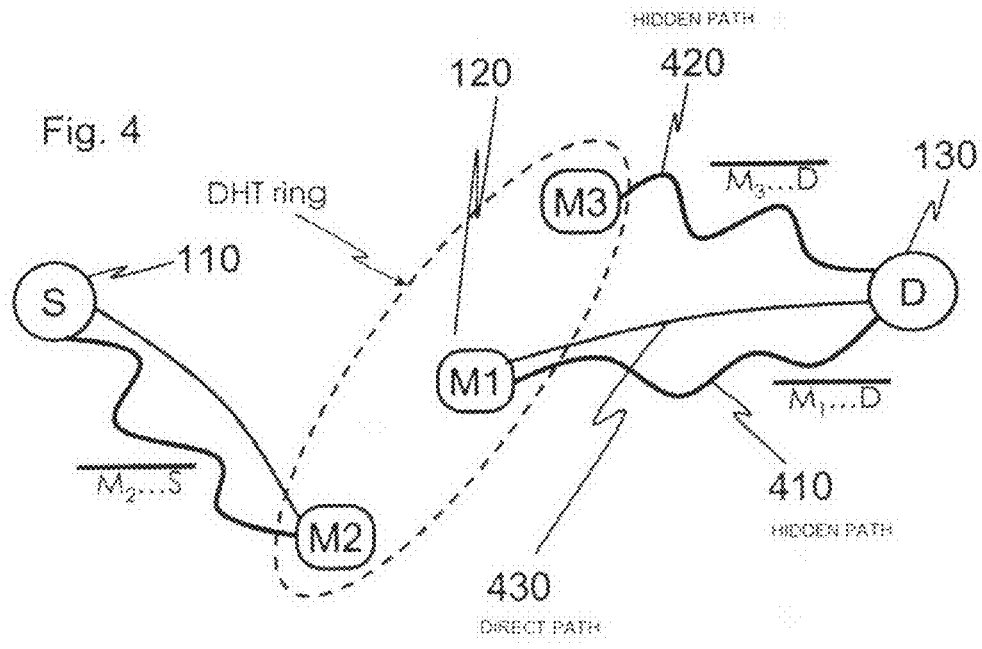
FIG. 4 shows a schematic drawing for illustrating a setup mechanism for a source to request paths from a destination.

An alternative setup mechanism used by sources 110 to request paths from the destination is next explained. FIG. 4 illustrates this process with a schematic drawing of another example of setting up a hidden path for the source 110 to send data packets to the destination 130. Suppose the destination 130 has several hidden paths 410, 420 from multiple middle-boxes. The destination 130 chooses one (or more) of the hidden paths, and assigns this path or these paths for setup. At this phase, the destination 130 sends (the information describing) this hidden path over a direct path 430 going to the originator middle-box 120 i.e. to the middle-box from which the path originates. In this example, the destination 130 chooses middle-box M1 as a starting point for the setup path. A source 110 that wants to request paths from the destination 130 may send a request packet to any middle-box (here M2). Note, however, that this source-selected middle-box might be different from the middle-box chosen by the destination 130. The request packet may contain the destination identifier, the hidden path from the source-selected middle-box to the source 110, and the source identifier. Upon receiving the request, the source-selected middle-box (M2) may look up the destination 130 using a Distributed Hash Table (DHT) mechanism. As both the middle-boxes, that is, the destination chosen middle-box M1 and the source-selected middle-box M2 are part of a common DHT ring, the DHT mechanism normally identifies the source-selected middle-box M2 with the middle-box address used to reach the destination 130, in addition to the hidden path from the middle-box to the destination 130. The DHT may then return to the source-selected middle-box M2 with the destination-chosen middle-box address M1, along with the hidden path {M1 . . . D}. The source-selected middle-box may then forward the request packet via this path to the destination 130. Now, the destination 130 may reply with a new path (M3) to the source 110, using the other hidden path 420 provided by the source 110.

The advantage of this mechanism is that the setup process does not require revealing to the source 110 the middle-box that is used to reach the destination 130. While an attacking source 110 may continue to send requests to the destination 130, such an attacking source 19 has no control over how the requests will reach the destination 130 (or if they ever will reach the destination 130).

In case of using a proxy or generally any intervening network entity (i.e. provisioning node) to grant hidden paths on behalf of the destination, the destination is also separated from the path requests and thus even better secured against DDoS attacks than in case where some interfaces are accessible to data sources for path requests. However, a separate mechanism may then be provided in order to refuse granting paths to attacking data sources. Some mechanisms are next explained. It is appreciated that any one of these mechanisms may be used either alone or in combination with other mechanisms.

In one embodiment, the destination that issues a path to a source-selected middle-box may also simultaneously inform the source-selected middle-box of destinations to which hidden paths should not be granted. This informing may be implemented by sending a list of prohibited data sources (e.g. as a list of prohibited Internet addresses) or by including a pointer to such a list stored by a network entity other than the destination.

In another embodiment, a third party may deduce data sources 110 which are performing attacks and provide a deduced attacker list for use by the source-selected middle-box.

Further still, in one embodiment, the source-selected middle-box may be configured to ask for a permissions to the use of each hidden path using a throttle setting. Such a throttle setting may involve limiting the number of permission enquiries to a given total rate per source-selected middle-box (e.g. 1000 enquiries per second) and/or to a given rate per data source (e.g. with a frequency of 0.2, 0.5 or 1 Hz).

In still further embodiment, the DHT ring may be configured to maintain a common list of prohibited data sources in which prohibited sources are collected from all members of the DTH ring and applied for all destinations. However, such a common prohibiting list might be abused by a rogue destination that could wrongly list valid data sources as attackers to prevent their legitimate operation. This risk may be avoided or mitigated if the path grant determination process uses only information provided by the destination itself or by the destination and trusted third parties.

Defending Against DDoS Attacks

In an embodiment of the invention, a source 110 that wants to communicate with a destination 130 needs to request paths from the destination 130. To achieve this, the source 110 needs a setup mechanism. One approach was explained in connection with FIG. 3, i.e. using a globally reachable address of the destination 130 to request for a hidden path. In that case, the source 110 is allowed to send request packets to the destination 130 using the globally reachable destination address. However, the attacker could use the setup channel itself to launch a large scale DDoS attack, preventing legitimate sources from obtaining paths. To mitigate such attacks, existing techniques such as using control channels or puzzles may be used. According to yet another embodiment of the present invention, a novel setup mechanism is provided (see FIG. 4) to avoid using globally known addresses of the destination 130.

It is also recalled that the source 110 has to request for paths to the destination 130, and since the destination has the ability to classify traffic from sources as wanted or unwanted, a known offender i.e. a malicious source will never receive the path. However, during initialization, the destination may not have sufficient information to classify traffic as wanted or unwanted. In this case, a simple policy for the destination is to issue paths to unknown sources. The attacker could gain a path using this initial uncertainty to attack the destination.

In an embodiment of the invention, the paths are set to expire after a predetermined time. Hence, routers or generally middle-boxes remove the FSD 142 from their internal tables after assigned timers t_r expires. A source 110 (i.e. potential attacker) cannot use the path to send traffic any longer after the path expiry, since the routers do not have the necessary state to forward packets and such packets are simply abandoned during their forwarding process. The destination will not return newer paths to attackers, while well-behaving sources 110 get newer paths as the old ones expire. The attacker could try to gain newer paths using different sources, but would then be forced to use a substantially larger a base of attacking bots or hijacked computers.

Unfortunately, an attacker with a large army of bots might still be able to disable the destination for some duration (depending on path expiration time and number of attack bots). Namely, the destination 130 has a limited number of incoming interfaces 131, 132, 133. If these links form a bottleneck, then an attacker with a large army could gain paths that are spread across all the interfaces. The issue is that paths generated by the network are unpredictable, both for the source 110 and for the destination 130. Even if armed with a path, the destination 130 has no way to know which path maps to which of its incoming interface 131, 132, 133. To overcome this problem there is yet further embodiment being disclosed. That is, each router, before forwarding a probe packet, may insert a unique Router Identifier (RID, ref. 605 in FIG. 6) into the probe message. The Router IDs are different from the router addresses, and have no meaning whatsoever in the context of routing. Also the destination 130 may associate its own interface identity to the probe message 140. The RIDs are not permanent, but change over a longer time scale. Given different probe packets 140, the destination may determine the upstream topology using the RIDs. Then, the destination 130 may handle unclassified sources by issuing paths that map to interfaces other than the interfaces that are being used by trusted sources. Such a selection of paths is illustrated in FIG. 5.

Figure 5:
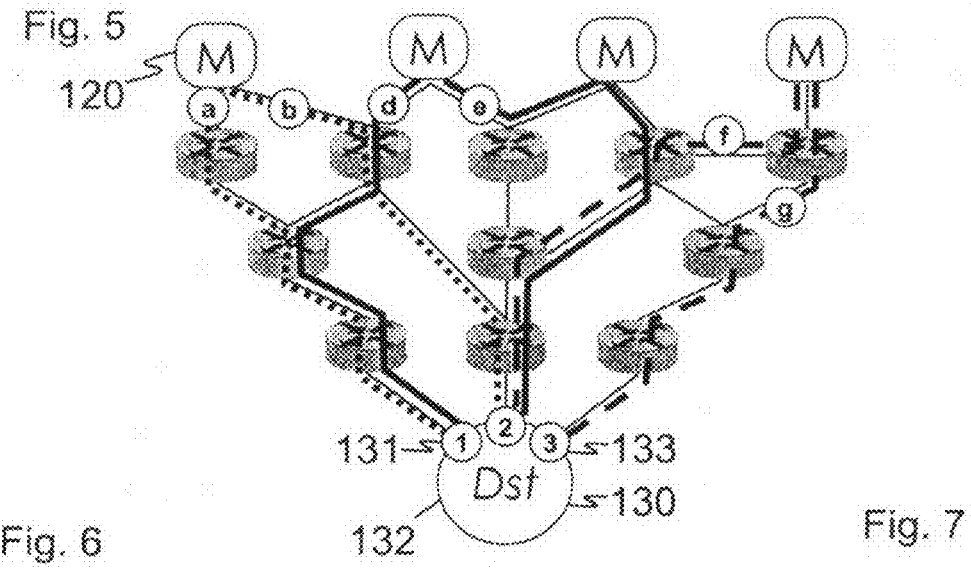
FIG. 5 shows a schematic drawing for illustrating how the destination can identify the upstream topology and issue different paths to different sources.

FIG. 5 shows a schematic drawing for illustrating how the destination constructs the upstream topology from RIDs and issues different paths to different sources. The destination constructs the upstream topology using probe messages for different paths denoted as a and b from one middle-box, d and e from another middle-box, and f and g from yet another middle-box. From the topology (constructed using the RIDs), the destination finds out that paths a and d map to interface 1, paths b, f and e map to interface 2, and path g maps to interface 3. Now, the destination may decide, for instance, to hand out paths b, f and e to unclassified sources, while reserving paths a, d and g to more trusted sources.

Avoiding Loops when Probing for Paths

Since the probe messages 140 are sent through randomly chosen outgoing interfaces at each router, the probe messages might enter into a loop (until associated time-to-live, TTL, counter is decremented to zero) and never reach the destination 130. In an embodiment of the invention loops are avoided by using Router ID fields (RIDs). Each router is provided with an RID and then each router, before inserting an FSD 142, checks if its own RID appears in the list of RIDs. If so, it immediately drops the probe packet.

It is appreciated from the foregoing, that in some embodiments of the invention, temporary source-routed paths may be used to prevent DDoS attacks based on the following conditions:

1. Destination decides whether packets should reach the destination or not.

Here, a decision may refer to a process of identifying what traffic is wanted or unwanted. How to decide is a question of local policy at the destination i.e. data recipient or receiver. The receiver has suitable mechanism for categorizing data traffic into wanted and unwanted traffic. For example, an Intrusion Detection System (IDS) may be used to drive the decision process. The IDS may comprise any one or more of the following: a network intrusion detection system; a protocol-based intrusion detection system; an application protocol-based intrusion detection system; and a host-based intrusion detection system.

2. A source cannot initiate data transfer until the receiver issues a path.

In other words, in order for the source to communicate with the receiver, it requires a path that is only known to the receiver. Packets from the source are source routed to the receiver using the path issued by the receiver. Source routing generally refers to specifying by the sender the route which the packet takes through the network on traveling to the destination. In source routing, the entire path to the destination is known to the source and is included in outgoing data packets. Source routing differs from the normal routing of the Internet in that the routing decisions are predefined for each router along the way. Source routing is traditionally used for troubleshooting and for allowing a source to directly manage network performance by forcing packets to travel over one path to prevent congestion on another. In this embodiment, the source routing is used for a new purpose. Thanks to source routing, the destination may express a path to the destination with limited exposing of nodes up to itself to DDoS attacks. This is an important feature that will be explained with more detail in the following 3. The receiver can revoke paths that are issued to sources.

The decision making is a dynamic process that changes over time. For instance, initially the receiver may not have sufficient information about a source to clearly declare its traffic as wanted or unwanted i.e., the source is or remains unclassified. In this case, the receiver might still issue a path, but would like to revoke the path when the decision changes. This may be implemented by subjecting the path to a timed expiration.

FIG. 6 shows an illustration of a structure of a probe message 140 according to an embodiment of the invention. The probe message may contain a header including any of the following data fields: a version 601, type 602 of the message, TTL-field 603, the address 604 of the probing middle-box, a list of FSD data fields 142 and a corresponding list of router IDs 605 (e.g. for avoiding loops, and to allow the destination to construct upstream topology). FIG. 6 also presents typical lengths in bits for each data field according to one embodiment of the invention.

FIG. 7 shows an illustration of a structure of a data packet 230 carrying user data (payload) 704 from a source to the destination according to an embodiment of the invention. Among version 601 and type 602 fields in common with the probe packet 140, the data packet 230 comprises a length field 701. The data packet 230 further comprises the address 604 of the middle-box that operates as an access node i.e. is selected by the destination for operating as a starting point for the path to the interface of the destination to which the data packet 230 is destined. Further, the data packet 230 has the FSDs 142, a destination identifier 702, and a source identifier 703. The destination and source identifiers are used by upper layer protocols, for example transport protocols (such as TCP).

Figure 8:
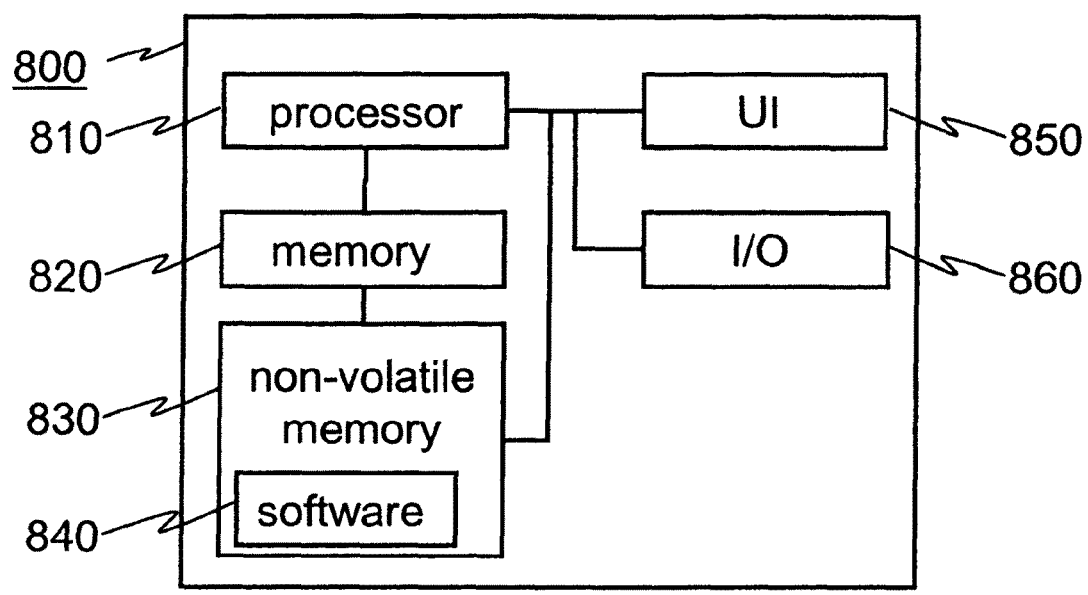
FIG. 8 shows a block diagram of a computer suited for operating as a source, destination or middle-box according to an embodiment of the invention.

FIG. 8 shows a block diagram of a computer 800 suitable for use as a source, destination or middle-box according to an embodiment of the invention in a system 100 of FIG. 1. The computer 800 comprises a processor 810, a memory 820 for use by the processor to control the operation of the computer 800, a non-volatile memory 830 for storing long-term data such as software 840 comprising an operating system and computer executable applications, a user interface 850 for user interaction such as voice input and/or output, and an input/output system 860 for communication with other entities in a packet data network.

The processor 810 may be a master control unit MCU. Alternatively, the processor may be a microprocessor, a digital signal processor, an application specific integrated circuit, a field programmable gate array, a microcontroller or a combination of such elements.

It is appreciated that without receiving a path from the destination, the source cannot send data to the source. Even though using network capabilities some similar properties may be seen (i.e., the destination's consent has to be obtained), the capability approach results in computationally expensive cryptographic operations. The aforementioned examples may achieve this goal using simple operations based on selecting unpredictable paths. Further, since the paths may be set to expire, it may be unnecessary to install any additional filters or to verify capabilities to prevent DDoS attacks when the destination makes incorrect decisions about a source. While an unclassified source may be able to obtain a path, the path may be set to expire before the source is able to cause significant harm to the destination. Finally, it is noted that existing proposals do not trivially extend to multipath network. Specifically, multipath networks allow end hosts to split a single flow (such as TCP flow) into multiple sub-flows. Under such systems, existing capability mechanisms need to be re-architected to allow capabilities on sub-flows.

Cellular systems may particularly benefit from different embodiments of the invention. Namely, mobile telephones and various data terminals need various types of server functions for a variety of different services as known from the field of mobile communications. However, the communicating over the radio interface may be expensive. Further, mobile communications typically has narrower data bands than in fixed communications networks and thus more prone for congestion or blockage when exposed to malicious attacks. In one embodiment, a cellular network operator provides a multipath data network between common internet and its internet enabled subscribers. In such a case, a multipath network may be provided between a gateway server that connects the operator's packet data network and a mobile IP (internet protocol) home agent. Alternatively, the multipath network may extend further towards the subscriber, e.g. up to a foreign agent or up to the mobile agent itself. It may further be advantageous to implement the functions of the destination by an intervening core network before data traffic towards a subscriber enters on a wireless path.

The appended abstract is incorporated as one exemplary and non-binding embodiment to this description.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
    storing path information that describes an arbitrary path between an intermediate multipath communication network node and a multipath communication network destination node; wherein the intermediate multipath communication network node is referred to as an access node; the arbitrary path information further comprising an access node identification based on which data packets are routable to the access node;
    the arbitrary path information further comprising an indication of a destination interface though which the multipath communication network destination node is accessible;
    providing the arbitrary path information to a data source; and
    receiving data from the data source via the destination interface, where the received data traverses the arbitrary path defined by the path information.

2. A method according to claim 1, wherein the destination interface is not commonly routable.

3. A method according to claim 1, wherein the destination interface is accessible only via a commonly routable multipath network node.

4. A method according to claim 1, wherein the access node is a commonly routable multipath network node.

5. A method according to claim 1, further comprising revoking the arbitrary path by the destination interface.

6. A method according to claim 5, wherein the revoking comprises temporally limiting validity of the path information.

7. A method according to claim 1, further comprising receiving a probe message originating from the access node via a series of further intermediate multipath nodes and obtaining the path information from the probe message.

8. A method according to claim 1, further comprising informing the data source of the arbitrary path indirectly through at least one particular intermediate multipath network node referred to as a path provisioning node.

9. A method according to claim 8, further comprising using a distributed hash table when indirectly informing the data source of the arbitrary path.

10. A method according to claim 8, further comprising informing the path provisioning node of data sources to which the path information should not be provided.

11. A method according to claim 1, further comprising scheduling different arbitrary paths for simultaneous use to avoid use of common communication network nodes on two simultaneously usable paths.

12. A method comprising:
    obtaining path information that describes an arbitrary path between an intermediate multipath communication network node and a multipath communication network destination node; wherein the intermediate multipath communication network node is referred to as an access node; the path information further comprising an access node identification by which data packets are routable to the access node;
    combining the path information that describes the arbitrary path with a data packet to be sent to the destination node; and
    transmitting the data packet to the destination node, where the data packet is transmitted to an interface of the destination node that is identified by the path information via the access node, where the transmitted data packet traverses the arbitrary path defined by the path information.

13. A method according to claim 12, further comprising contacting a commonly routable interface of the multipath communication network destination node by a request message and responsively receiving the path information.

14. A method according to claim 12, further comprising indirectly obtaining the path information, that describes the arbitrary path, from the multipath communication network destination node through at least one particular intermediate multipath network node referred to as a path provisioning node.

15. A method according to claim 14, further comprising using a distributed hash table when indirectly obtaining the path information that describes the arbitrary path.

16. A method comprising:
    periodically producing probe messages comprising an identifier of an access node and a random number;
    sending each of the probe messages through a random interface of the access node;
    storing in a table an association between the random number and the random interface for each of the probe messages; and
    determining path information that describes an arbitrary path between an intermediate multipath communication network node and a multipath communication network destination node; wherein the intermediate multipath communication network node is referred to as the access node; the path information further comprising the access node identification based on which data packets are routable to the access node.

17. A method according to claim 16, further comprising associating a timer with each of the probe messages; and deleting the association between the random number and the random interface after the associated timer meets a predetermined threshold.

18. A method comprising:
    receiving a probe packet comprising an identifier indicative of an origin of the probe packet and comprising identification of at least one intervening multipath router based on router interfaces;
    selecting a random interface;
    generating a random number within a predetermined number space;
    storing in a table an association of the random number and the random interface; and
    including the random number in the probe packet and forwarding the probe packet through the selected random interface.

19. A method according to claim 18, further comprising setting a period of validity and deleting the stored association after the period of validity.

20. A method according to claim 18, further comprising storing a router identifier and when the probe packet already contains the router identifier abstaining from forwarding the probe packet.

21. A method according to claim 20, further comprising, in a case where the probe packet does not contain the router identifier, adding the router identifier to the probe packet before forwarding the probe packet through the selected random interface.

22. An apparatus comprising:
    a memory configured to store path information that describes an arbitrary path between an intermediate multipath communication network node and the apparatus; wherein the intermediate multipath communication network node is referred to as an access node; the arbitrary path information further comprising an access node identification based on which data packets are routable to the access node;

a processor configured to contain in the arbitrary path information an indication of a destination interface though which the apparatus is accessible;

an output interface configured to provide to a data source the arbitrary path information; and an input interface configured to receive data from the data source via the destination interface, where the received data traverses the arbitrary path defined by the path information.

23. An apparatus according to claim 22, wherein the processor is further configured to enable revoking of the arbitrary path.

24. An apparatus according to claim 22, wherein revoking comprises temporally limiting validity of the path information.

25. An apparatus according to claim 22, wherein the probe message is received from the access node via a series of further intermediate multipath nodes and the processor is further configured to obtain the path information from the probe message.

26. An apparatus according to claim 22, wherein the output interface is configured to inform the data source of the arbitrary path indirectly through at least one particular intermediate multipath network node referred to as a path provisioning node.

27. An apparatus according to claim 26, where said processor is further configured to inform the path provisioning node of data sources to which the path information should not be provided.

28. An apparatus according to claim 22, wherein the output interface is configured to inform the data source of the arbitrary path indirectly using a distributed hash table through at least one particular intermediate multipath network node referred to as a path provisioning node.

29. An apparatus according to claim 22, wherein the processor is further configured to schedule different arbitrary paths for simultaneous use to avoid use of common communication network nodes on two simultaneously usable paths.

30. An apparatus comprising a processor, an input interface and an output interface, said processor configured to obtain from said input interface path information that describes an arbitrary path between an intermediate multipath communication network node and a multipath communication network destination node; wherein the intermediate multipath communication network node is referred to as an access node; the path information further comprising an access node identification by which data packets are routable to the access node;

said processor further configured to combine the path information that describes the arbitrary path with a data packet to be sent to the multipath communication network destination node; and to transmit from said output interface the data packet to an interface of the destination node that is identified by the path information via the access node, where the transmitted data packet traverses the arbitrary path defined by the path information.

31. An apparatus according to claim 30, where said processor is further configured to contact a commonly routable interface of the destination node by a request message and to responsively receive the path information.

32. An apparatus according to claim 30, where said processor is further configured to indirectly obtain the path information from the destination node through at least one particular intermediate multipath network node referred to as a path provisioning node.

33. An apparatus according to claim 30, where said processor is further configured to indirectly obtain the path information from the destination node through at least one particular intermediate multipath network node referred to as a path provisioning node using a distributed hash table.

34. An apparatus comprising:
a plurality of communication interfaces; and
a processor configured to
periodically produce probe messages comprising an identifier of an access node and a random number;
send each of the probe messages through a random interface of the access node;
storing in a table an association between the random number and the random interface for each of the probe messages; and
determine path information that describes an arbitrary path between an intermediate multipath communication network node and a multipath communication network destination node; wherein the intermediate multipath communication network node is referred to as the access node; the path information further comprising the access node identification based on which data packets are routable to the access node.

35. An apparatus according to claim 34, wherein the processor is further configured to associate a timer with each of the probe messages and to delete the association between the random number and the random interface after the associated timer meets a predetermined threshold.

36. An apparatus comprising:
an input interface configured to receive a probe packet comprising an identifier indicative of an origin of the probe packet and comprising identification of at least one intervening multipath router based on router interfaces; and
a processor configured to perform operations of:
selecting a random interface;
generating a random number within a predetermined number space;
storing in a table an association of the random number and the random interface; and
including the random number in the probe packet and forwarding the probe packet through the selected random interface.

37. An apparatus according to claim 36, wherein the processor is further configured to set a period of validity and to delete the stored association after the period of validity.

38. An apparatus according to claim 36, further comprising a memory configured to store a router identifier and the processor is further configured to verify when the probe packet already contains the router identifier to abstain from forwarding the probe packet.

39. An apparatus according to claim 38, wherein the processor is further configured to, in a case where the probe packet does not contain the router identifier, add the router identifier to the probe packet before forwarding the probe packet through the selected random interface.

40. A non-transitory memory medium storing a computer program comprising computer executable program code which when executed by a processor enables the processor to:
store path information that describes an arbitrary path between an intermediate multipath communication network node and a multipath communication network destination node;
wherein the intermediate multipath communication network node is referred to as an access node; the arbitrary path information further comprising an access node identification based on which data packets are routable to the access node;

the arbitrary path information further comprising an indication of a destination interface though which the multipath communication network destination node is accessible;

provide the arbitrary path information to a data source; and receive data from the data source via the destination interface, where the received data traverses the arbitrary path defined by the path information.

41. A non-transitory memory medium storing a computer program comprising computer executable program code which when executed by a processor enables the processor to:

obtain path information that describes an arbitrary path between an intermediate multipath communication network node and a multipath communication network destination node;

wherein the intermediate multipath communication network node is referred to as an access node; the path information further comprising an access node identification by which data packets are routable to the access node;

combine the path information that describes the arbitrary path with a data packet to be sent to the destination node; and transmit the data packet to the destination node, where the data packet is transmitted to an interface of the destination node that is identified by the path information via the access node, where the transmitted data packet traverses the arbitrary path defined by the path information.

42. A non-transitory memory medium storing a computer program comprising computer executable program code which when executed by a processor enables the processor to:

periodically produce probe messages comprising an identifier of an access node and a random number;

send each of the probe messages through a random interface of the access node;

store in a table an association between the random number and the random interface for each of the probe messages; and determine path information that describes an arbitrary path between an intermediate multipath communication network node and a multipath communication network destination node;

wherein the intermediate multipath communication network node is referred to as the access node; the path information further comprising the access node identification based on which data packets are routable to the access node.

* * * * *